US012583518B2

(12) United States Patent
Mohamad

(10) Patent No.: US 12,583,518 B2
(45) Date of Patent: Mar. 24, 2026

(54) METHOD FOR OPERATING A PARKING ASSISTANCE SYSTEM, COMPUTER PROGRAM PRODUCT, PARKING ASSISTANCE SYSTEM AND VEHICLE

(71) Applicant: Valeo Schalter und Sensoren GmbH, Bietigheim-Bissingen (DE)

(72) Inventor: Usama Mohamad, Neuses (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 102 days.

(21) Appl. No.: 18/284,018

(22) PCT Filed: Mar. 24, 2022

(86) PCT No.: PCT/EP2022/057727
§ 371 (c)(1),
(2) Date: Sep. 25, 2023

(87) PCT Pub. No.: WO2022/200482
PCT Pub. Date: Sep. 29, 2022

(65) Prior Publication Data
US 2024/0158010 A1 May 16, 2024

(30) Foreign Application Priority Data
Mar. 25, 2021 (DE) ..................... 10 2021 107 523.8

(51) Int. Cl.
*B60W 60/00* (2020.01)
*B60W 40/02* (2006.01)
*B62D 15/02* (2006.01)
(52) U.S. Cl.
CPC ......... *B62D 15/0285* (2013.01); *B60W 40/02* (2013.01); *B60W 2420/403* (2013.01)

(58) Field of Classification Search
CPC .............. B62D 15/0285; B60W 40/02; B60W 2420/403
See application file for complete search history.

(56) References Cited

U.S. PATENT DOCUMENTS

2019/0051414 A1* 2/2019 Lyubich ................. G16H 20/60
2020/0033868 A1 1/2020 Palanisamy et al.
(Continued)

FOREIGN PATENT DOCUMENTS

CN 103661105 A 3/2014
CN 203698410 U 7/2014
(Continued)

OTHER PUBLICATIONS

Office Action issued in corresponding JP Application No. 2023-558551; dated Sep. 3, 2024 (8 Pages with English Translation).
(Continued)

*Primary Examiner* — Gonzalo Laguarda
(74) *Attorney, Agent, or Firm* — Osha Bergman Watanabe & Burton LLP

(57) ABSTRACT

A method for operating a parking assistance system (110) for a vehicle (100) is proposed, which is configured to capture and store a trajectory to be trained, in a training mode (MOD0), and which is configured to follow the stored trajectory by means of the vehicle (100) in a following mode (MOD1). In order to ascertain whether stored optical features, which are used to orient the vehicle in the following mode, need to be updated, distributions of parameters of the optical features are compared. If the similarity of the compared distributions falls below a predetermined threshold, an update is carried out.

11 Claims, 6 Drawing Sheets

(56)         References Cited

U.S. PATENT DOCUMENTS

| | | | |
|---|---|---|---|
| 2020/0180612 A1 | 6/2020 | Finelt et al. | |
| 2020/0285997 A1 | 9/2020 | Bhattacharyya et al. | |
| 2020/0339195 A1 | 10/2020 | Feijoo et al. | |
| 2025/0018969 A1* | 1/2025 | Xiao | .......................... G06T 7/73 |

FOREIGN PATENT DOCUMENTS

| | | | |
|---|---|---|---|
| DE | 102007051612 A1 | 5/2009 | |
| DE | 102017115991 A1 | 1/2019 | |
| DE | 102017123848 A1 | 4/2019 | |
| DE | 102018104963 A1 | 9/2019 | |
| DE | 102019114399 A1 | 12/2020 | |
| JP | 2018-075890 A | 5/2018 | |
| WO | WO-2019016114 A1 * | 1/2019 | |

OTHER PUBLICATIONS

International Search Report and Written Opinion in corresponding International Application No. PCT/EP2022/057727, dated Jul. 18, 2022 (15 pages).

German Search Report in corresponding German Application No. 10 2021 107 523.8, dated Dec. 8, 2021 (8 pages).

Office Action in corresponding Chinese Application No. 202280024057.8, dated Dec. 23, 2025.

\* cited by examiner

200

100

110

120

METHOD FOR OPERATING A PARKING ASSISTANCE SYSTEM, COMPUTER PROGRAM PRODUCT, PARKING ASSISTANCE SYSTEM AND VEHICLE

The present invention relates to a method for operating a parking assistance, a computer program product, a parking assistance system and a vehicle.

Parking assistance systems are known that can learn a specific trajectory to be followed, wherein in a training mode the vehicle is driven manually along the trajectory to be followed later. During this training run, environmental data is captured via the vehicle sensors and stored, which should enable the vehicle to be located during subsequent following step. This can be done, for example, by means of VSLAM, wherein camera images are acquired and evaluated, and a current position of the vehicle is thus ascertained.

In this method, it is important that the stored environment data is current, otherwise localization will not be possible. Because the environment can change over time, for example because moving objects are removed, added, or repositioned, or because construction work is being carried out in the surrounding area, the problem arises that the environmental data can lose its currency. To continue to perform the localization successfully, an update of the stored environmental data must be performed.

DE 10 2017 115 991 A1 discloses a method for operating a driver assistance system for a motor vehicle in which, in a training phase of the driver assistance system, while the motor vehicle is maneuvered by a driver manually along a trajectory, the trajectory is stored and on the basis of at least one image, which is provided with a camera of the motor vehicle, a plurality of object features is stored. In an operating phase of the driver assistance system, the motor vehicle is maneuvered semi-autonomously along the stored trajectory based on the stored trajectory and the stored object features. In the operating mode, a plurality of object features is detected and the detected object features are assigned to the stored object features. Based on the assignment, a decision is made as to whether it is necessary to store the object features and/or the trajectory again.

Against this background, an object of the present invention is to improve the operation of a parking assistance system.

According to a first aspect, a method for operating a parking assistance system for a vehicle is proposed. The parking assistance system is configured to capture and store a trajectory to be trained, in a training mode, and is configured to follow the stored trajectory by means of the vehicle in a following mode. The training mode comprises:

A1) manually driving the vehicle along the trajectory,

A2) receiving at least one image of an environment of the vehicle during manual driving, A3) ascertaining a plurality of optical features in the received image, wherein each optical feature is characterized by at least one parameter, and A4) storing a data set comprising the ascertained features. The following mode comprises:

B1) receiving at least one current image of the environment of the vehicle during the following operation, B2) ascertaining the optical features in the received current image, B3) ascertaining a first distribution of at least one of the parameters on the basis of the stored data set and ascertaining a second distribution of the parameter on the basis of the ascertained optical features of the current image, B4) ascertaining a similarity between the first distribution and the second distribution, and B5) updating the stored data set if the ascertained similarity is less than or equal to a predetermined update threshold.

This method has the advantage that an update of the stored data set with the optical features used to locate the vehicle in the following mode is updated only if a statistical significance for a necessary update is ascertained. On the one hand, this avoids the possibility of an update being carried out even in the case of minor changes in the environment, and therefore the computing power necessary for this, which would have to be provided by the parking assistance system or another computing unit of the vehicle, is not consumed. This means that the processing power is available for other processes, which contributes, for example, to increased security, reliability and/or speed of other running processes. On the other hand, the method creates a reliable measure, being based purely on statistics, in order to reliably assess whether an update of a particular data set is useful, i.e. contributes significantly, for example, to an improved localization of the vehicle.

In the training mode, the vehicle is moved manually, in particular, by a user of the vehicle. This means that the user exercises control of the vehicle at all times. However, this does not exclude the possibility that a remote control and/or self-steering and/or self-driving systems of the vehicle are used, wherein even sensor-assisted decisions about a change in direction of travel can be proposed and/or carried out by the vehicle.

The received image is in particular an image that is received by an in-vehicle camera, for example a front camera. It can also be an image composed of multiple images from different cameras and/or images acquired at different times. The received image may comprise in particular an extended spectral range, for example, the image may comprise optical information in the near infrared range and in the UV range. For example, the image contains spectral information between 2,500 nm-150 nm. Furthermore, the image may contain information in one or more sharply delimited spectral ranges, which have been acquired, for example, using appropriate band or line filters, which can optimize a contrast for ascertaining the optical features in the respective image. The received image is in particular a digital image that can be represented in the form of a two-dimensional pixel matrix, wherein the pixel matrix can comprise a plurality of planes, wherein each plane contains, for example, the information from a specific spectral range. For example, in the case of a color image, it can be provided with three layers corresponding to three captured color channels, in particular red, green, and blue (RGB).

The optical features ascertained in the image have, for example, certain characteristics, such as a certain contrast between adjacent pixels and/or across a plurality of pixels, a certain shape, such as a round shape, an angular shape, an elongated shape, a wavy shape and the like. Different image processing methods and/or image transformations can be used to ascertain the optical features and can be combined in different orders. Furthermore, neural networks can be used, in particular to perform an object classification of objects visible in the image.

A particular feature is characterized in particular by a plurality of parameters. These parameters include, in particular, the position of the feature in the image, wherein the position is defined by at least two coordinates, for example an x-value and a y-value, a "color" of the feature, a shape of the feature, an extent of the feature, which can be specified, for example, by the number of pixels that the feature covers, a classification of the feature and the like. The "color" of a particular feature can be specified, for example, by specifying an intensity (brightness information) of the feature at a specific wavelength or for a specific filter. For example, the intensity is determined by the value of a pixel matrix entry associated with a pixel. The number of possible values that a parameter can take ranges from binary ("0" or "1") to quasi-continuous without upper and/or lower limits. "Quasi-continuous" because the data in the present case is processed digitally, which is why the parameter values are quantized, even if the corresponding parameter itself is of a continuous nature.

In a single image, at least 50 optical features and up to 5,000 optical features are preferably ascertained. It should be noted that a larger number of optical features requires a correspondingly larger amount of memory to store the data set. On the other hand, while the accuracy of a localization increases with the number of optical features, this increase flattens off as the number increases. Preferably, between 100 and 500 optical features are ascertained per image and stored in the data set.

For example, the data set comprises a list or table of optical features, with each feature being assigned the corresponding parameter values. Not all optical features ascertained must necessarily include a corresponding value for each possible parameter, or they have a value that identifies a parameter as "undefined".

The reception of the images and ascertainment of the optical features is carried out in particular in the same manner in the training mode and the following mode, for example, the same image processing methods are used. However, the accuracy with which individual or multiple computational operations are performed might vary, for example, depending on the available system resources. This does not exclude the possibility that new and/or other image processing steps and methods may be added during the useful life of the parking assistance system as part of a system update or the like. After the system update has been performed, these will then again be used in the same manner for the training mode and the following mode. This ensures that results of the same quality and/or type are achieved in the training mode and in the following mode.

If the optical features have been ascertained for the current received image, the first and second distribution of at least one of the parameters is ascertained in the next step. The distribution ascertained in this case is in particular a probability distribution. It can also be said that the value of a parameter is randomly distributed over all the optical features of a given image, hence the parameter forms a random variable. The distribution of this random variable is characteristic of a given image.

The ascertained distribution can be one-dimensional or also multi-dimensional. For example, a local distribution of the optical features in a two-dimensional image can be ascertained as a two-dimensional distribution. A multidimensional distribution is not limited to parameters of the same type (such as location coordinates), but a multidimensional distribution can also be ascertained on the basis of a parameter "location coordinate" and a parameter "color" and/or other and/or additional parameters.

By comparing the two distributions, the similarity of the distributions can be ascertained. The similarity of the distributions corresponds, for example, to the intersection, the common set or the overlap of the distributions. In the case of multidimensional distributions the similarity can be ascertained separately for different dimensions (parameters) of the distributions.

Depending on the similarity of the distributions obtained, it is then ascertained whether or not the stored data set is updated. In particular, the similarity obtained can be compared to an update threshold, wherein if the similarity obtained is below the update threshold, an update is performed.

If the respective first and second distribution are ascertained for multiple parameters and the similarity is ascertained, then an overall similarity can be ascertained on the basis of the multiple similarities obtained. The similarity values of the distributions of different parameters can be taken into account to varying degrees. For example, the similarity of the distributions of the y-position (vertical position) can be taken into account to a greater extent than the similarity of the distributions of the x-position (horizontal position), or vice versa.

The parking assistance system is designed in particular for partially autonomous or fully autonomous operation of the vehicle, wherein it automatically drives along the trained trajectory, for example, in the following mode. Semi-autonomous driving is understood to mean for example that the parking assistance system controls a steering apparatus and/or an automatic gear selection system. Fully autonomous driving is understood to mean for example that the parking assistance system additionally also controls a drive device and a braking device. An orientation and/or localization of the vehicle is carried out in particular on the basis of a comparison of the ascertained optical features with the stored data sets. From the absolute and/or relative arrangement of the ascertained optical features with respect to each other, a displacement or relative position of the current position of the vehicle in relation to the respective position during the training run can be ascertained and the vehicle can be controlled accordingly to the trained trajectory and along the trained trajectory.

According to one embodiment of the method, the parameters of the optical features comprise a respective position of each feature in the image, a classification of the respective feature, a color of the respective feature, a geometric shape of the respective feature, a contrast value of the respective feature and the like.

As already indicated above, the parameter "color" means, for example, an intensity (brightness) at a specific wavelength, in a specific wavelength band and/or at multiple wavelengths. Furthermore, the parameter "color" may include a ratio of two or more than two intensities at different wavelengths.

The contrast value parameter can include a pure intensity contrast, but it can also include a color contrast.

A particular optical feature is uniquely characterized by the specification of the assigned or associated parameter values. For example, the parameter values can be arranged in a parameter vector, wherein the position in the vector identifies the parameter.

According to another embodiment of the method, the similarity between the first and second distribution is ascertained on the basis of the Bhattacharyya distance and/or the Kullback-Leibler distance.

According to another embodiment of the method, steps A2)-A4) are performed for multiple positions along the trajectory to be trained, so that a corresponding data set is stored for each of the positions. In the following mode, steps B3)-B5) are performed on the basis of those stored data sets for which the corresponding position is at a distance from a current position of the vehicle that is less than or equal to a predetermined distance threshold value.

In this embodiment, the trained trajectory is assigned a plurality of data sets with ascertained optical features, each of which was ascertained on the basis of images captured at different positions along the trajectory. The current vehicle position is a useful indicator of whether it makes sense to compare two distributions to each other. Because if the positions from which the images that are or were used to ascertain the optical features are too different, the distributions are assumed to be dissimilar because the images may show different sections or regions of the environment. In this case, it would be detrimental to perform an update, which can be reliably avoided by comparing the position. This embodiment can also be referred to as a selection method for selecting the data sets or distributions to be compared.

The position of the vehicle can be ascertained in particular by using a position sensor, such as GPS. Alternatively or additionally, odometry can be used to ascertain the respective position. It should be noted that the term "position" in this example also includes an orientation of the vehicle, which can be ascertained by a magnetic field sensor, for example, relative to the earth's magnetic field and/or an artificial horizon.

In embodiments, in the following mode only the stored data set is used, which has a corresponding position with a smallest distance from a current position of the vehicle in comparison to the other stored data sets of the trajectory.

According to another embodiment of the method, steps A2)-A4) are performed for multiple positions along the trajectory to be trained, so that a corresponding data set is stored for each of the positions. In the following mode, steps B3) and B4) are performed for all stored data sets and step B5) is performed for those data sets, the first distribution of which has a similarity to the second distribution above a predetermined similarity threshold value.

In this embodiment, the trained trajectory is assigned a plurality of data sets with determined optical features, each of which was determined on the basis of images captured at different positions along the trajectory. In this embodiment, the similarity of the distributions is used as a basis to ascertain whether or not the images of the environment underlying the respective distribution show a comparable section or region from the environment. This embodiment can be combined in particular with the selection method based on the position.

In this embodiment, two predetermined threshold values for similarity are thus present: the update threshold and the similarity threshold.

According to another embodiment of the method, the predetermined similarity threshold value corresponds to a lower similarity than the predetermined update threshold.

This means that those data sets having a similarity above the similarity threshold but at the same time below the update threshold, are updated.

For example, the similarity threshold has a value between 65%-75%, and the update threshold has a value between 80%-95%. If the similarity is between 75%-80%, it is then ascertained that the corresponding data set needs to be updated. A value of 100% means that two compared distributions are identical, and a value of 0% means that two compared distributions have no intersection or commonality at all.

According to a further embodiment of the method, step B5) is carried out only for the data set with a first distribution that has the greatest similarity to the second distribution, compared to all data sets of the trajectory.

According to a further embodiment of the method, on the basis of a respective time stamp of the images received in the training mode, a first stochastic process of the first distribution of the at least one parameter is ascertained, and wherein on the basis of the respective time stamp of the images received in the following mode, a second stochastic process of the second distribution of the parameter is ascertained, and wherein step B5) is additionally and/or alternatively carried out on the basis of the similarity between the first stochastic process and the second stochastic process.

In this embodiment, the temporal evolution of the distribution of a parameter is determined along the trajectory, which is coupled via the vehicle speed with the position of the vehicle along the trajectory, and the decision relating to the update is linked to this. It can also be said that in this case the time is treated as an additional parameter, so that, for example, the temporal evolution of the distribution of a location coordinate can be represented in the form of a two-dimensional distribution.

According to another embodiment of the method, the data set update in step B5) is carried out on the basis of the optical features ascertained in step B2).

According to a further embodiment of the method, the data set update in step B5) comprises replacing the data set with a current data set and/or replacing at least one optical feature contained in the stored data set and/or updating at least one parameter of an optical feature contained in the stored data set.

According to a second aspect, what is proposed is a computer program product that comprises commands that, when the program is executed by a computer, prompt said computer to perform the method according to the first aspect.

A computer program product, such as for example a computer program means, may for example be provided or supplied by a server in a network as a storage medium, such as for example a memory card, USB stick, CD-ROM, DVD, or else in the form of a downloadable file. This may take place for example in a wireless communication network by transmitting a corresponding file containing the computer program product or the computer program means.

According to a third aspect, a parking assistance system for a vehicle is proposed. The parking assistance system is configured to capture and store a trajectory to be trained, in a training mode, and is configured to follow the stored trajectory by means of the vehicle in a following mode. The parking assistance system comprises:

a reception unit for receiving at least one image of an environment of the vehicle while said vehicle travels along the trajectory to be trained, in the training mode, a first ascertainment unit for ascertaining a plurality of optical features in the received image, wherein each optical feature is characterized by at least one parameter, and a storage unit for storing a data set comprising the ascertained optical features, wherein the reception unit is configured to receive at least one current image of the environment of the vehicle while the vehicle travels along the trajectory in the following mode and the first ascertainment unit is configured to determine the optical features in the received current image. The parking assistance system also comprises:

a second ascertainment unit for ascertaining a first distribution of at least one of the parameters on the basis of the stored data set and for ascertaining a second distribution of the parameter on the basis of the ascertained optical features of the current image, a comparison unit for ascertaining a similarity between the first distribution and the second distribution, and an updating unit for updating the stored data set if the ascertained similarity is less than or equal to a predetermined update threshold.

This parking assistance system has the same advantages as described for the method according to the first aspect. The embodiments and definitions set out for the method according to the first aspect apply mutatis mutandis to the parking assistance system.

Each of the units of the parking assistance system may be implemented in hardware and/or software. In the case of an implementation in hardware, the respective unit may be in the form of a computer or a microprocessor, for example. In the case of an implementation in software, the respective unit may be in the form of a computer program product, a function, a routine, an algorithm, part of a program code, or an executable object. Furthermore, each of the units mentioned here may also be in the form of part of a superordinate control system of the vehicle, such as a central control system and/or an ECU (Engine Control Unit).

According to a fourth aspect, what is proposed is a vehicle having at least one camera for detecting and outputting an image of the environment of the vehicle and having a parking assistance system according to the third aspect.

The vehicle is, for example, an automobile or even a truck. Preferably, the vehicle comprises a number of sensor units which are configured to capture the driving state of the vehicle and to capture the surroundings of the vehicle. Examples of such sensor units of the vehicle are image capture devices, such as a camera, a radar (radio detection and ranging) or a lidar (light detection and ranging), ultrasonic sensors, location sensors, wheel angle sensors and/or wheel speed sensors. The sensor units are each configured to output a sensor signal, for example to the parking assistance system or driver assistance system, which carries out the partially autonomous or fully autonomous driving on the basis of the captured sensor signals.

Further possible implementations of the invention also comprise not explicitly mentioned combinations of features or embodiments described above or below with regard to the exemplary embodiments. A person skilled in the art will in this case also add individual aspects as improvements or additions to the respective basic form of the invention.

Further advantageous configurations and aspects of the invention are the subject of the dependent claims and of the exemplary embodiments of the invention that are described below. The invention is explained in more detail below on the basis of preferred embodiments with reference to the accompanying figures.

Identical or functionally identical elements have been provided with the same reference signs in the figures, unless stated otherwise.

Figure 1:
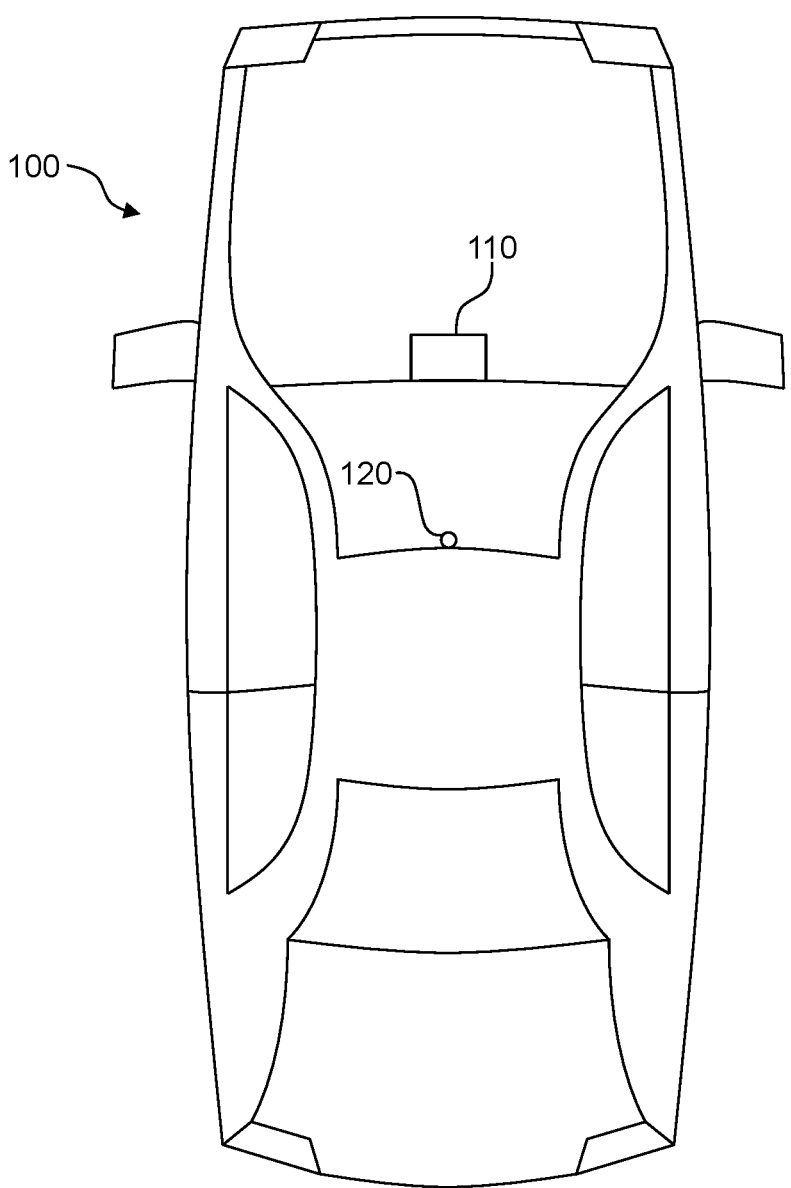
FIG. 1 shows a schematic view of an exemplary embodiment of a vehicle from a bird's eye perspective.

FIG. 1 shows a schematic view of a vehicle 100 from a bird's eye perspective. The vehicle 100 is, for example, an automobile that is arranged in surroundings 200. The automobile 100 has a parking assistance system 110 that is in the form of a control unit, for example. Furthermore, the automobile 100 comprises a front camera 120, which in this example is arranged on an upper edge of the windscreen. The camera 120 is configured to capture an image of the environment 200. The captured image is output, for example, to the parking assistance system 110, which receives and further processes it, as described in detail below with reference to FIGS. 2-6.

The parking assistance system 110 is configured to drive the automobile 100 semi-autonomously or even fully autonomously. In addition to the camera 120 shown in FIG. 1, the vehicle 100 can have various further sensor devices. Examples of these are ultrasonic sensors, a lidar, a radar, a GPS receiver, an acceleration sensor, a receiver for receiving electromagnetically transmissible data signals, a microphone and the like.

Figure 2:
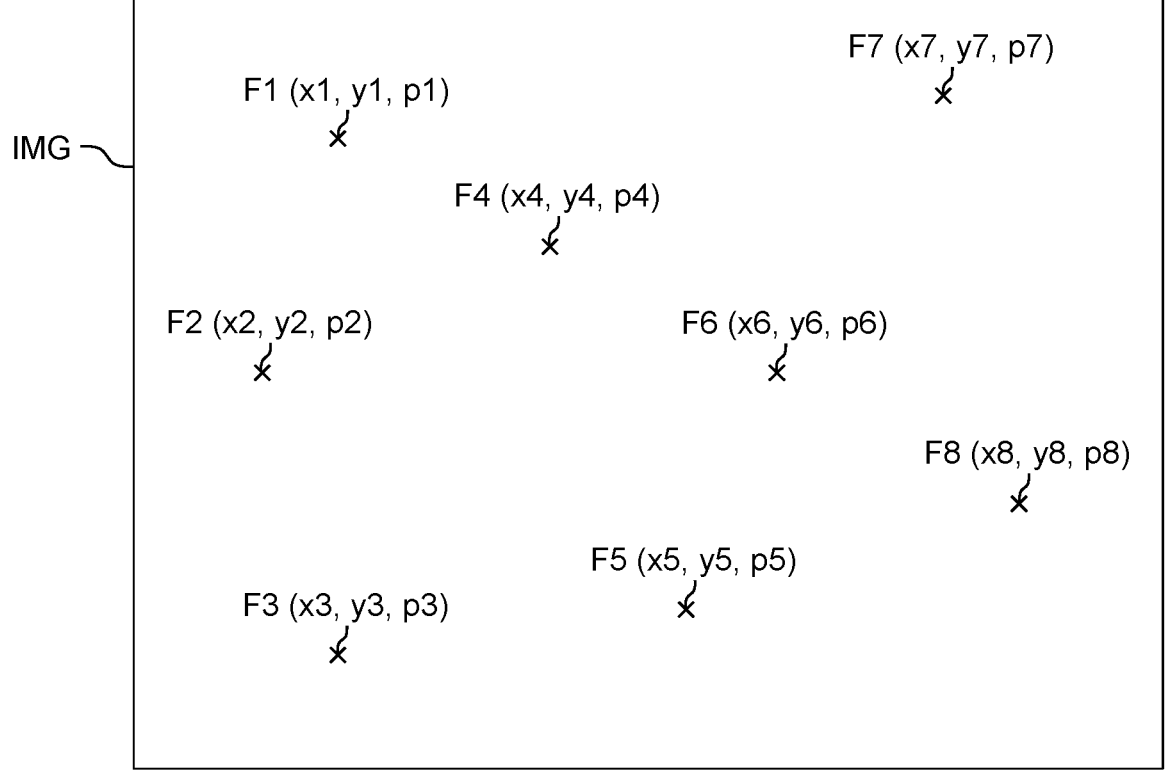
FIG. 2 shows a schematic view of a received image with a number of optical features contained therein.

FIG. 2 shows a schematic view of a received image IMG with a number of optical features F1-F8 contained therein. In this example, the image IMG is an image with two spatial dimensions, i.e. it comprises a two-dimensional array of pixels. In embodiments, it may also be an image with three spatial dimensions, which additionally comprises depth information for each pixel. Each pixel of the image IMG is uniquely determined by its respective coordinates in the image IMG, where these are two location coordinates x, y. The coordinates x, y relate to an image coordinate system (not shown), which originates for example in one of the corners of the image IMG. Accordingly, the illustrated exemplary optical features F1-F8 have two location parameters, which correspond to the x, y coordinates of the respective optical feature. It should be noted that in this example, for reasons of clarity, the optical features F1-F8 are only shown as dots in the image IMG, but a particular optical feature may also have an extent.

In addition to the location coordinates x, y, the optical features F1-F8 are characterized by a third parameter p, which is, for example, a color value of the optical feature F1-F8. In this example, a particular optical feature is thus uniquely characterized by the specification of the three parameters x, y, p. For example, the optical feature F1 can be represented by the specification F1 ($x1$, y1, p1), where x1, y1, P1 are the respective values of the respective parameter for the optical feature F1.

It should be noted that a particular optical feature F1-F8 can be characterized by more than three parameters. It should also be noted that in an image IMG, significantly more than eight optical features F1-F8 are preferably ascertained, for example between 200 and 500 optical features.

Each optical feature F1-F8 is in particular a characteristic structure in the received image IMG, which can be ascertained, for example, in the form of a contrast.

Figure 3:
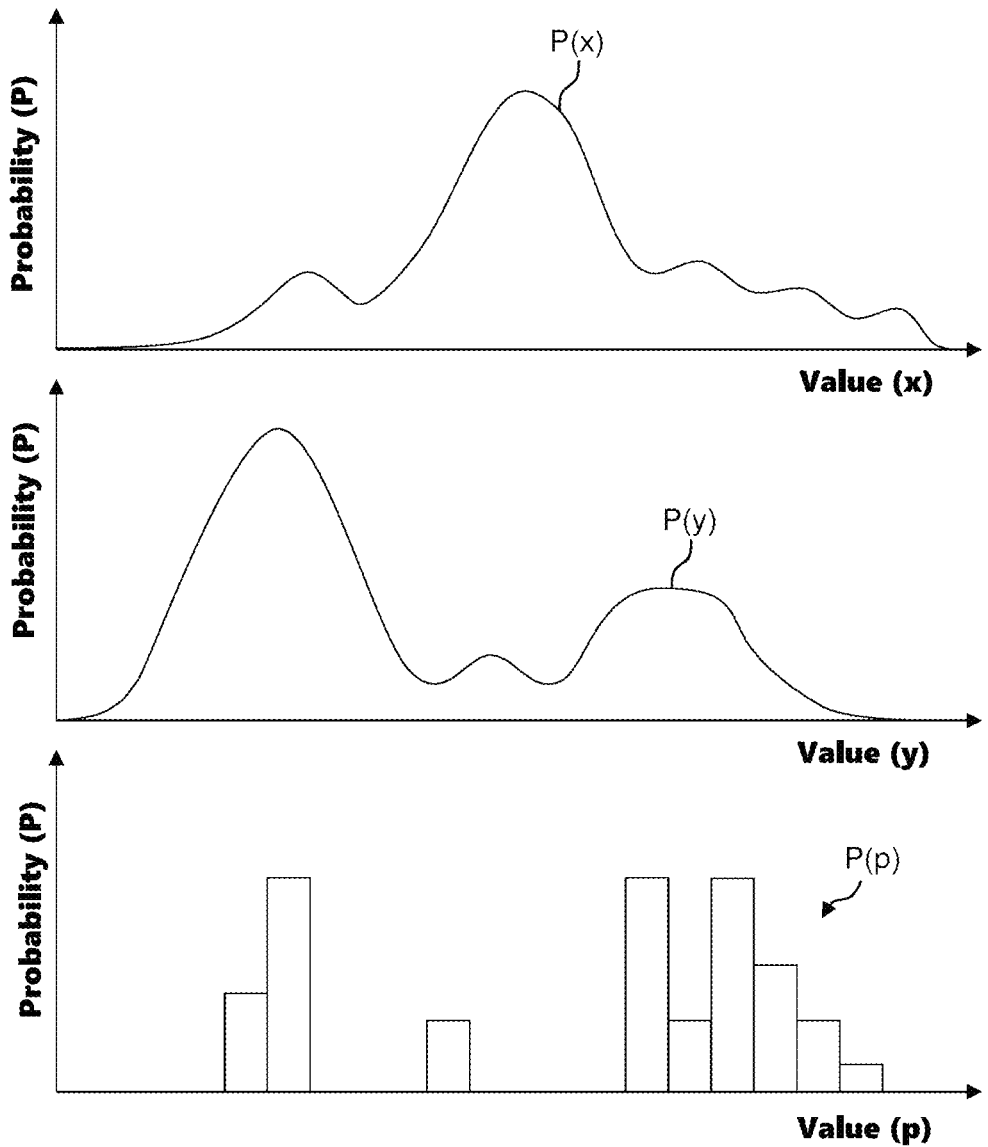
FIG. 3 shows three diagrams as examples of a respective distribution of a respective parameter.

FIG. 3 shows three diagrams as examples of a respective distribution P(x), P(y), P(p) of a given parameter x, y, p. The distributions each represent a probability distribution or a frequency distribution, wherein the vertical axis P indicates the probability or frequency and the respective horizontal axis x, y, p indicates the value of the respective parameter x, y, p.

In this example, the distributions P(x) and P(y) are represented as (quasi) continuous distributions, and the distribution P(p) is represented as a discrete distribution. Since the respective values which a parameter x, y, p can assume are in particular quantized during the ascertainment by the ascertainment unit of the parking assistance system, all distributions, for example, are discrete but can also be referred to as quasi-continuous distributions. Here, a data reduction can also be advantageous, which is carried out, for example, in the form of a "binning" procedure, wherein all values that lie in a certain interval are assigned to a mean value (for example, in the case of a reduction in the bit depth for a parameter).

Figure 4:
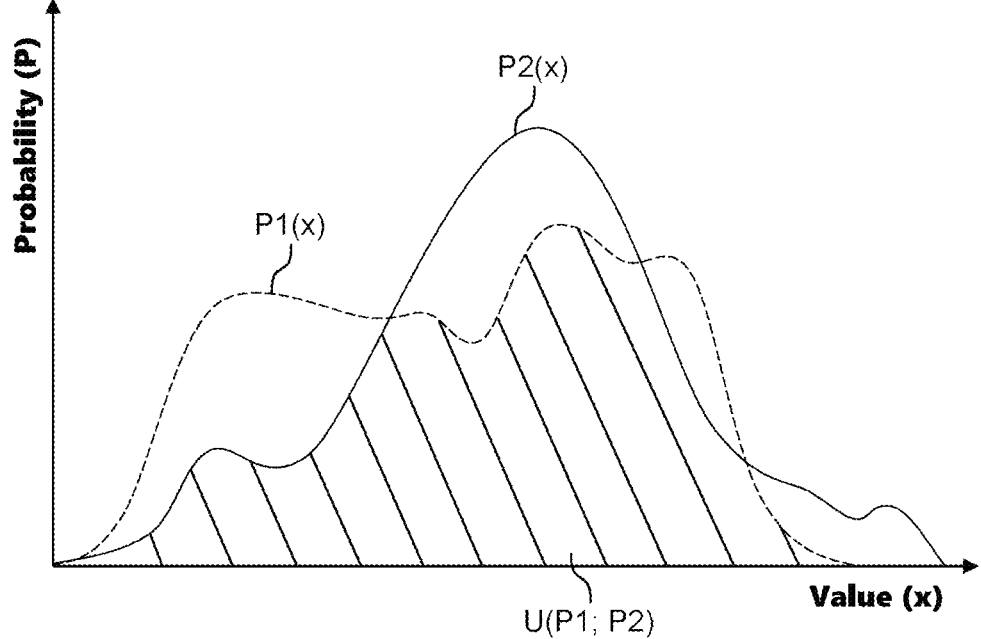
FIG. 4 shows an example of a comparison of two distributions for ascertaining the similarity.

FIG. 4 shows a diagram containing two distributions P1(x), P2(x) for a parameter x. FIG. 4 serves to illustrate what is meant by the similarity of two distributions P1(x), P2(x). For example, the first distribution P1(x) is the first distribution of the parameter x, which was ascertained on the basis of the stored data set, and the distribution P2(x) is the second distribution of the same parameter x, which was ascertained on the basis of the ascertained optical features F1-F8 (see FIG. 2) of the received current image IMG (see FIG. 2). The similarity between the two distributions P1(x), P2(x) can be illustrated as the intersection U(P1; P2) of the two distributions P1(x), P2(x). For example, the number of equal parameter values x in the two distributions P1(x), P2(x) can be counted and divided by the total number of optical features F1-F8 to ascertain the similarity. Advantageously, the similarity between two distributions P1(x), P2(x) is ascertained on the basis of the Bhattacharyya distance and/or the Kullback-Leibler distance. Other known measures of similarity can also be used.

Figure 5:
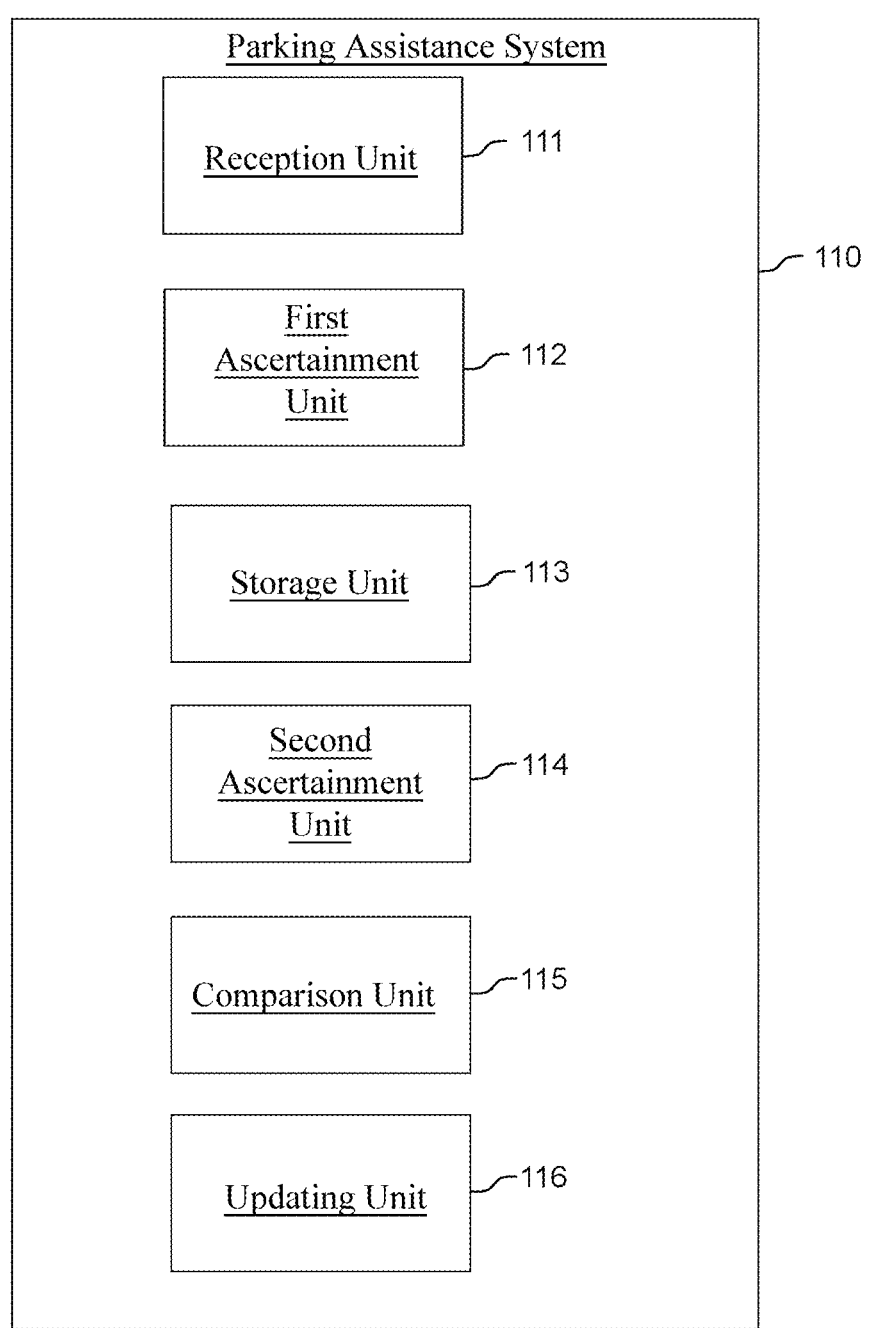
FIG. 5 shows a schematic block diagram of an exemplary embodiment of a parking assistance system.

FIG. 5 shows a schematic block diagram of an exemplary embodiment of a parking assistance system 110, for example the parking assistance system of the vehicle 100 of FIG. 1. The parking assistance system 110 is configured to capture and store a trajectory to be trained, in a training mode MOD0 (see FIG. 6), and is configured to follow the stored trajectory by means of the vehicle 100 in a following mode MOD1 (see FIG. 6). The parking assistance system 110 comprises a reception unit 111 for receiving at least one image IMG (see FIG. 2) of an environment 200 (see FIG. 1) of the vehicle 100, while this travels along the trajectory to be trained in the training mode MOD0, a first ascertainment unit 112 for ascertaining a plurality of optical features F1-F8 (see FIG. 2) in the received image IMG, wherein each optical feature F1-F8 is characterized by at least one parameter x, y, p (see FIG. 2 or 3), and a storage unit 113 for storing a data set comprising the ascertained optical features F1-F8.

The reception unit 111 is also configured to receive at least one current image IMG of the environment 200 of the vehicle 100 while the vehicle 100 travels along the trajectory in the following mode MOD1 and the first ascertainment unit 112 is also configured to ascertain the optical features F1-F8 in the received current image IMG. The parking assistance system 110 further comprises a second ascertainment unit 114 for ascertaining a first distribution P(x), P(y), P(p), P1(x) (see FIG. 3 or 4) of at least one of the parameters x, y, p on the basis of the stored data set and for ascertaining a second distribution P(x), P(y), P(p), P2(x) (see FIG. 3 or 4) of the parameter x, y, p on the basis of the ascertained optical features F1-F8 of the current image IMG, a comparison unit 115 for ascertaining a similarity between the first distribution P(x), P(y), P(p), P1(x) and the second distribution P(x), P(y), P(p), P2(x) and an updating unit 116 for updating the stored data set if the ascertained similarity is less than or equal to a predetermined update threshold.

Figure 6:
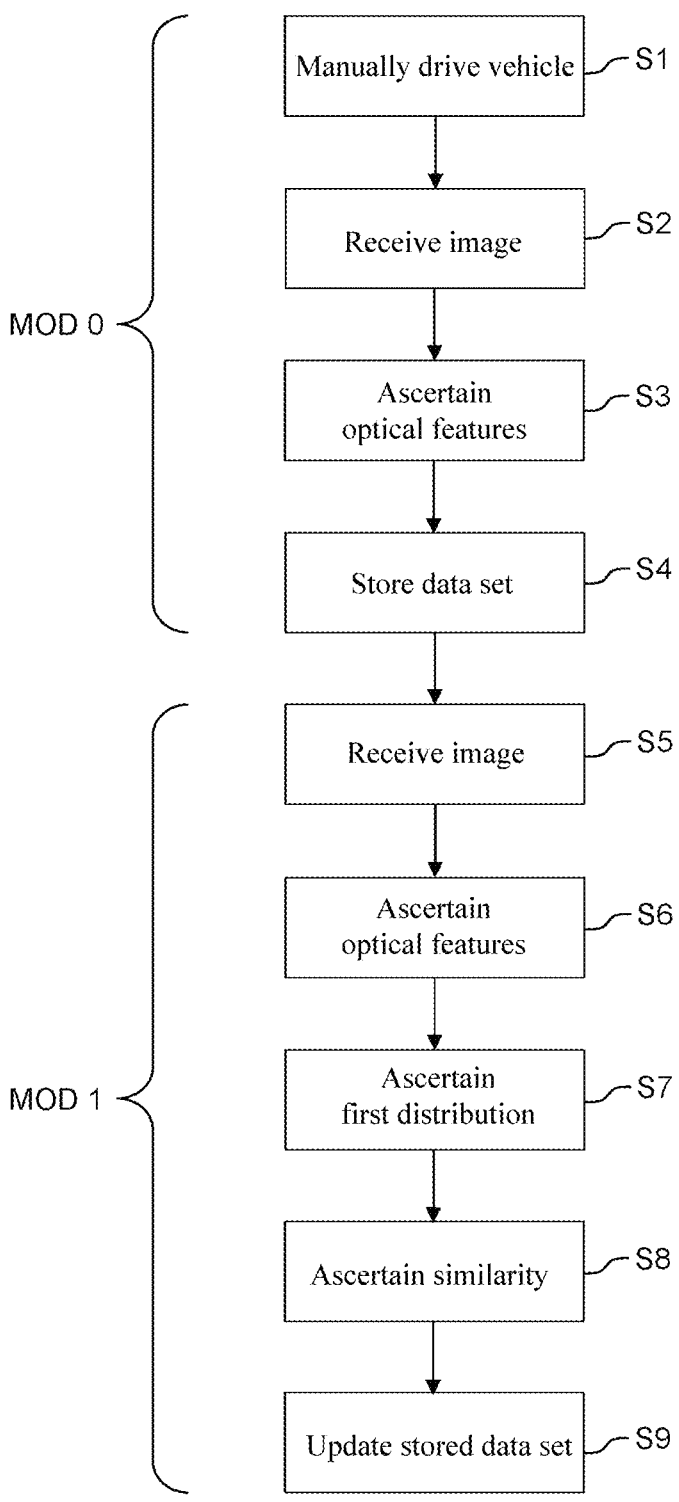
FIG. 6 shows a schematic flow diagram of an exemplary embodiment of a method for operating a parking assistance system.

FIG. 6 shows a schematic flow diagram of an exemplary embodiment of a method for operating a parking assistance system 110, for example the parking assistance system 110 of the vehicle 1 of FIG. 5. The method comprises a training mode MOD0, in which a trajectory to be trained is captured and stored, and comprises a following mode, in which the stored trajectory is followed by means of the vehicle.

The training mode MOD0 comprises in particular the steps S1-S4, wherein in a first step S1 the vehicle 100 is driven manually along the trajectory, in a second step S2 at least one image IMG (see FIG. 2) of an environment 200 (see FIG. 1) of the vehicle 100 is received during the manual driving step, in a third step S3 a plurality of optical features F1-F8 (see FIG. 2) in the received image IMG are ascertained, wherein a respective optical feature F1-F8 is characterized by at least one parameter x, y, p (see FIG. 2 or 3), and in a fourth step S4 a data set comprising the ascertained optical features F1-F8 is stored.

The following mode comprises in particular steps S5-S9, wherein in a fifth step S5 at least one current image IMG of the environment 200 of the vehicle 100 is received during the following process, in a sixth step S6 the optical features F1-F8 in the received current image IMG are ascertained, in a seventh step S7 a first distribution P(x), P(y), P(p), P1(x) (see FIG. 3 or 4) of at least one of the parameters x, y, p is ascertained on the basis of the stored data set and a second distribution P(x), P(y), P(p), P2(x) (see FIG. 3 or 4) of the parameter x, y, p is ascertained on the basis of the ascertained optical features F1-F8 of the current image IMG, in an eighth step S8 a similarity of the first distribution P(x), P(y), P(p), P1(x) to the second distribution P(x), P(y), P(p), P2(x) is ascertained and in a ninth step S9 the stored data set is updated if the similarity ascertained is less than or equal to a predetermined update threshold.

It should be noted that the training mode MOD0 for a particular trajectory is performed in particular only once, wherein the following mode MOD1 can be performed as often as desired on the basis of the trained trajectory.

It should also be noted that the following mode MOD1 may comprise further steps relating, for example, to the control of the vehicle 100 by the parking assistance system 110.

Although the present invention has been described on the basis of exemplary embodiments, it may be modified in many ways.

LIST OF REFERENCE SIGNS 100 vehicle
110 parking assistance system
111 reception unit
112 ascertainment unit
113 storage unit
114 ascertainment unit
115 comparison unit
116 updating unit
120 camera
F1-F8 optical feature
IMG image
MOD0 training mode
MOD1 following mode
p parameter
p1-p8 parameter value
P probability
P(p) probability distribution
P(x) probability distribution
P1(x) first distribution
P2(x) second distribution
P(y) probability distribution S1-S9 method steps
U(P1; P2) intersection
x coordinate
x1-x8 x position (an example of a parameter)
y coordinate
y1-y8 y position (an example of a parameter)

The invention claimed is:

1. A method for operating a parking assistance system for a vehicle, comprising:

capturing and storing a trajectory to be trained, in a training mode; and autonomously or semi-autonomously following the stored trajectory by the vehicle in a following mode by controlling a steering apparatus and an automatic gear selection system of the vehicle, wherein the training mode comprises:

A1) manually driving the vehicle along the trajectory,

A2) receiving at least one image of an environment of the vehicle during manual driving, A3) ascertaining a plurality of optical features in the received image, wherein each optical feature is characterized by at least one parameter, and A4) storing a data set comprising the ascertained optical features;

wherein the following mode comprises:

B1) receiving at least one current image of the environment of the vehicle while operating the parking assistance system in the following mode, B2) ascertaining the optical features in the received current image, B3) ascertaining a first distribution of at least one of the parameters based on the stored data set and ascertaining a second distribution of the parameter based on the ascertained optical features of the current image, B4) ascertaining a similarity between the first distribution and the second distribution, and B5) updating the stored data set if the similarity ascertained is less than or equal to a predetermined update threshold;

wherein in the training mode, steps A2)-A4) are carried out for multiple positions along the trajectory to be trained, so that for each of the positions a corresponding data set is stored, wherein in the following mode, steps B3) and B4) are carried out for all stored data sets, and wherein step B5) is carried out when the first distribution and the second distribution have a similarity threshold value above a predetermined similarity threshold.

2. The method as claimed in claim 1, wherein the parameters of the optical features comprise a respective position of each feature in the image, a classification of the respective feature, a color of the respective feature, a geometric shape of the respective feature, and/or a contrast value of the respective feature.

3. The method as claimed in claim 1, wherein the similarity between the first and second distribution is ascertained based on a Bhattacharyya distance or a Kullback-Leibler distance.

4. The method as claimed in claim 1, wherein in the training mode, steps A2)-A4) are carried out for multiple positions along the trajectory to be trained, so that for each of the positions a corresponding data set is stored, and wherein in the following mode, steps B3)-B5) are carried out based on those stored data sets, the corresponding position of which are at a distance from a current position of the vehicle, which is less than or equal to a predetermined distance threshold value.

5. The method as claimed in claim 1, wherein the similarity threshold value corresponds to a lower similarity than an update threshold value.

6. The method as claimed in claim 1, wherein step B5) is carried out only for the data set that has a first distribution with a greatest similarity to the second distribution in comparison with all data sets of the trajectory.

7. The method as claimed in claim 4, wherein, based on a respective time stamp of the images received in the training mode, a first stochastic process of the first distribution of the at least one parameter is ascertained, and wherein based on the respective time stamp of the images received in the following mode, a second stochastic process of the second distribution of the parameter is ascertained, and wherein step B5) is carried out based on a similarity between the first stochastic process and the second stochastic process.

8. The method as claimed in claim 1, wherein updating the stored data set in step B5) is carried out based on the optical features ascertained in step B2).

9. The method as claimed in claim 1, wherein updating the stored data set in step B5) comprises replacing the data set with a current data set or replacing at least one optical feature contained in the stored data set or updating at least one parameter of an optical feature contained in the stored data set.

10. A parking assistance system for a vehicle, which is configured to capture and store a trajectory to be trained, in a training mode, and which is configured to follow the stored trajectory by the vehicle in a following mode, wherein the parking assistance system comprises:

a reception unit for receiving at least one image of an environment of the vehicle while said vehicle travels along the trajectory to be trained, in the training mode, a first ascertainment unit for ascertaining a plurality of optical features in the received image, wherein each optical feature is characterized by at least one parameter, and a storage unit for storing a data set comprising the ascertained optical features, wherein the reception unit is configured to receive at least one current image of the environment of the vehicle while the vehicle travels along the trajectory in the following mode and the first ascertainment unit is configured to ascertain the optical features in the received current image, and wherein the parking assistance system also comprises:

a second ascertainment unit for ascertaining a first distribution of at least one of the parameters based on the stored data set and for ascertaining a second distribution of the parameter based on the ascertained optical features of the current image, a comparison unit for ascertaining a similarity between the first distribution and the second distribution, and an updating unit for updating the stored data set if the ascertained similarity is less than or equal to a predetermined update threshold, wherein the parking assistance system is configured to control the vehicle to autonomously or semi-autonomously follow the stored trajectory in the following mode by controlling a steering apparatus and an automatic gear selection system of the vehicle, wherein, in the training mode, the reception unit receives the images, the first ascertainment unit ascertains the plurality of optical features, and the storage unit stores the data set for multiple positions along the trajectory to be trained, so that for each of the positions a corresponding data set is stored, wherein, in the following mode, the second ascertainment unit ascertains the first distribution of the at least one of the parameters and the comparison unit ascertains the similarity between the first distribution and the second distribution for all stored data sets, and wherein the updating unit updates the stored data set when the first distribution and the second distribution have a similarity threshold value above a predetermined similarity threshold.

11. A vehicle having at least one camera for capturing and outputting an image of the environment of the vehicle and having a parking assistance system as claimed in claim 10.

* * * * *